United States Patent
Lee et al.

(10) Patent No.: US 8,130,606 B2
(45) Date of Patent: Mar. 6, 2012

(54) METHOD AND APPARATUS FOR ENCODING/DECODING DATA, AND METHOD AND APPARATUS FOR RECORDING/REPRODUCING DATA

(75) Inventors: Jae Sung Lee, Seoul (KR); Young Soo Jang, Seoul (KR)

(73) Assignee: LG Electronics Inc., Seoul (KR)

(*) Notice: Subject to any disclaimer, the term of this patent is extended or adjusted under 35 U.S.C. 154(b) by 1176 days.

(21) Appl. No.: 11/907,656

(22) Filed: Oct. 16, 2007

(65) Prior Publication Data

US 2008/0089206 A1    Apr. 17, 2008

Related U.S. Application Data

(60) Provisional application No. 60/851,773, filed on Oct. 16, 2006.

(30) Foreign Application Priority Data

Jan. 26, 2007    (KR) .......................... 10-2007-0008363

(51) Int. Cl.
*G11B 20/10*    (2006.01)
(52) U.S. Cl. .................. 369/47.19; 369/103; 369/59.24
(58) Field of Classification Search ............... 369/47.19, 369/47.2–47.22, 103, 53.35, 59.21–59.23, 369/124.04, 124.05, 127.07, 59.24; 714/792–796; 375/242, 243, 265
See application file for complete search history.

(56) References Cited

U.S. PATENT DOCUMENTS

| | | | | |
|---|---|---|---|---|
| 5,349,589 | A | * | 9/1994 | Chennakeshu et al. ........ 714/795 |
| 5,946,329 | A | * | 8/1999 | Hirose et al. ................ 369/59.21 |
| 5,968,201 | A | * | 10/1999 | Shida et al. ..................... 714/746 |
| 6,487,155 | B1 | * | 11/2002 | Carson et al. ............... 369/47.19 |
| 6,731,692 | B1 | | 5/2004 | Bhoja |
| 6,785,212 | B1 | * | 8/2004 | Sim et al. .................... 369/59.22 |
| 6,937,551 | B2 | * | 8/2005 | Miyashita et al. .......... 369/53.16 |
| 2001/0033626 | A1 | | 10/2001 | Symes et al. |
| 2002/0016944 | A1 | * | 2/2002 | Yoshida et al. ............... 714/758 |
| 2002/0040462 | A1 | * | 4/2002 | Sawaguchi et al. ........... 714/794 |
| 2003/0151988 | A1 | * | 8/2003 | Katayama ................... 369/44.32 |
| 2005/0193318 | A1 | * | 9/2005 | Okumura et al. ............. 714/795 |
| 2007/0183442 | A1 | * | 8/2007 | Shibata ......................... 370/437 |
| 2008/0109710 | A1 | * | 5/2008 | Takanashi ..................... 714/799 |
| 2009/0086839 | A1 | * | 4/2009 | Xu et al. ....................... 375/262 |

FOREIGN PATENT DOCUMENTS

JP         2004-104170         4/2004

* cited by examiner

*Primary Examiner* — Thang Tran
(74) *Attorney, Agent, or Firm* — Harness, Dickey & Pierce (57) ABSTRACT

A method and apparatus for stably encoding/decoding data, and a method and apparatus for recording/reproducing data are disclosed. The method inserts decoding information into a data section including several predetermined-bit data, determines encoding values of the data according to a transition state of the data and a value of corresponding data, and generates the decoding information and the determined encoding values in units of the data section.

19 Claims, 7 Drawing Sheets

| Previous status<br>Current status | b'00($S_0$) | b'01($S_1$) | b'10($S_2$) | b'11($S_3$) |
|---|---|---|---|---|
| b'00($S_0$) | $B_0$ | $B_1$ | $B_2$ | $B_3$ |
| b'01($S_1$) | $B_1$ | $B_3$ | $B_0$ | $B_2$ |
| b'10($S_2$) | $B_2$ | $B_0$ | $B_3$ | $B_1$ |
| b'11($S_3$) | $B_3$ | $B_2$ | $B_1$ | $B_0$ |

FIG. 3

| Book / 4bit of msg | $B_0$ | $B_1$ | $B_2$ | $B_3$ |
|---|---|---|---|---|
| b'0000(1) | 00001111 | 01001011 | 01110010 | 10101001 |
| b'0001(2) | 00010111 | 01001101 | 01110100 | 10101010 |
| b'0010(3) | 00011011 | 01001110 | 01111000 | 10101100 |
| b'0011(4) | 00011101 | 01010011 | 10000111 | 10110001 |
| b'0100(5) | 00011110 | 01010101 | 10001011 | 10110010 |
| b'0101(6) | 00100111 | 01010110 | 10001101 | 10110100 |
| b'0110(7) | 00101011 | 01011001 | 01011001 | 10111000 |
| b'0111(8) | 00101101 | 01011010 | 10010011 | 11000011 |
| b'1000(9) | 00101110 | 01011100 | 10010101 | 11000101 |
| b'1001(10) | 00110011 | 01100011 | 10010110 | 11000110 |
| b'1010(11) | 00110101 | 01100101 | 10011001 | 11001001 |
| b'1011(12) | 00110110 | 01100110 | 10011010 | 11001010 |
| b'1100(13) | 00111001 | 01101001 | 10011100 | 11001100 |
| b'1101(14) | 00111010 | 01101010 | 10100011 | 11010001 |
| b'1110(15) | 00111100 | 01101100 | 10100101 | 11010010 |
| b'1111(16) | 01000111 | 01110001 | 10100110 | 11010100 |

FIG. 6

|  | Modified Message word | | Code word | |
|---|---|---|---|---|
| | 111000 | $B_0$ | 00111100 | 15-th codeword from $B_0$ |
| | 111000 | $B_0$ | 00111100 | 15-th codeword from $B_0$ |
| | 111000 | $B_0$ | 11010010 | 15-th codeword from $B_3$ |
| | 110111 | $B_3$ | 10100011 | 14-th codeword from $B_2$ |
| Section(n) | 110101 | $B_2$ | 10100011 | 14-th codeword from $B_2$ |
| | 110011 | $B_2$ | 10011100 | 13-th codeword from $B_2$ |
| | 110001 | $B_2$ | 00111001 | 13-th codeword from $B_0$ |
| | 101110 | $B_0$ | 10011010 | |
| | 101100 | $B_2$ | 00110110 | |
| | 101100 | $B_0$ | 11001010 | |

Section(n+1)

| Book-combination | Path Matrices |
|---|---|
| B2 ⇒ B2 ⇒ B0 | 2.38 |
| B3 ⇒ B3 ⇒ B0 | 1.96 |
| B2 ⇒ B3 ⇒ B2 | 2.54 |
| ⋮ | ⋮ |

| State transition |
|---|
| S00 ⇒ S03 ⇒ S00 ⇒ S00 |

METHOD AND APPARATUS FOR ENCODING/DECODING DATA, AND METHOD AND APPARATUS FOR RECORDING/REPRODUCING DATA

This application claims the benefit of Korean Patent Application No. 10-2007-0008363 filed on Jan. 26, 2007, which are hereby incorporated by reference as if fully set forth herein.

This application claims the benefit of U.S. Provisional Application No. 60/851,773, filed on Oct. 16, 2006, in the name of inventors Jae Sung LEE and Young Soo JANG, entitled "APPARATUS AND METHOD FOR RECORDING AND REPRODUCING DATA TO/FROM RECORDING MEDIUM", which is hereby incorporated by reference as if fully set forth herein.

BACKGROUND OF THE INVENTION

1. Field of the Invention

The present invention relates to a method and apparatus for recording/reproducing data, and more particularly to a method and apparatus for encoding/decoding data, and a method and apparatus for recording/reproducing data using the encoding/decoding method.

2. Discussion of the Related Art

An apparatus (e.g., a compact disc (CD) or a digital versatile disc (DVD)) for recording/reproducing information or data in/from a recording medium can record information or data in a single-layered record surface, and can reproduce the information or data recorded in the single-layered record surface.

If the above-mentioned recording/reproducing surface of the recording medium is configured in the form of a laminated structure, storage capacity of the recording medium can be greatly increased. However, the number of the recording/reproducing surfaces capable of being laminated on the single recording medium is generally set to a maximum of 4, so that there is a limitation in increasing the storage capacity of the recording medium.

Due to the above-mentioned limited storage capacity of the recording medium, many developers are conducting intensive research into a new technology for increasing the storage capacity of the recording medium using holography.

The holography is indicative of a technology for reconstructing a light signal without any change. The holography can store an interference pattern, which is formed by both a target light including necessary information and a reference light received at an angle different from an angle of the target light, in the recording medium, or can reproduce information of the recording medium using a diffraction of the stored interference pattern.

In the case of using the above-mentioned holography-based storage technology, the interference pattern can be three-dimensional and overlapped in a direction of the recording-medium thickness so that the storage capacity of the recording medium can be greatly increased.

In other words, if data is recorded in the recording medium simultaneously while changing an incident angle, phase, and wavelength of the reference light, a plurality of holography information pieces can be recorded in a predetermined storage capacity. As a result, a recording medium with great storage capacity can be implemented.

In addition, a light signal and a recording light signal can be scanned on the recording medium using a beam splitter and an objective lens, so that an apparatus for recording/reproducing data in/from the recording medium (also called an optical recording/reproducing apparatus) can be configured in the form of a small-sized structure.

However, if an incident angle of the reference light signal is incorrect in a conventional optical recording/reproducing apparatus using the holography, many interferences are generated between recorded data pieces or reproduced data pieces.

For example, if data of the recording medium is reproduced, the incident angle of the reference light signal must be equal to that of the recording light signal. Provided that the incident angle of the reference light signal is not equal to that of the recording light signal, data recorded in the recording medium may be incorrectly recovered.

In order to correctly record or recover the data of the recording medium, a data encoding/decoding process for recording/reproducing data is a mater of great importance. Specifically, there is needed a new algorithm capable of correcting errors generated by the encoding/decoding process and correctly encoding/decoding data.

SUMMARY OF THE INVENTION

Accordingly, the present invention is directed to a method and apparatus for encoding/decoding data, and a method and apparatus for recording/reproducing data that substantially obviate one or more problems due to limitations and disadvantages of the related art.

An object of the present invention is to provide a method and apparatus for correctly and stably encoding/decoding data.

Another object of the present invention is to provide a method and apparatus for correctly and stably recording/reproducing data in/from a recording medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data encoding method comprises: inserting decoding information into a data section including several predetermined-bit data; determining encoding values of the data according to a transition state of the data and a value of corresponding data; and generating the decoding information and the determined encoding values in units of the data section.

Preferably, the inserting step includes: inserting the decoding information into the last data contained into the data section.

Preferably, the determining step includes: selecting one of several encoding groups, each of which includes several encoding values, according to transition states of previous and current data; and generating one of encoding values contained in the selected encoding group according to a value of a predetermined bit of the current data.

In another aspect of the present invention, there is provided a data encoding apparatus comprising: an encoder for inserting decoding information into a data section including several predetermined-bit data, and determining encoding values of the data according to a transition state of the data and a value of corresponding data; and a data output unit for outputting the decoding information and the determined encoding values in units of the data section.

In yet another aspect of the present invention, there is provided a data recording method comprising: inserting decoding information into a data section including several predetermined-bit data; determining encoding values of the data according to a transition state of the data and a value of corresponding data; and recording the decoding information and the determined encoding values in a recording medium in units of the data section.

Preferably, the recording step includes: generating a first light signal including the decoding information and the encoding values; and illuminating the first light signal on a predetermined area of the recording medium, and at the same time illuminating a second light signal on a predetermined area of the recording medium simultaneously while changing an incident angle.

In yet another aspect of the present invention, there is provided a data recording apparatus comprising: an encoder for inserting decoding information into a data section including several predetermined-bit data, and determining encoding values of the data according to a transition state of the data and a value of corresponding data; and a data recorder for recording the decoding information and the determined encoding values in a recording medium in units of the data section.

In yet another aspect of the present invention, there is provided a data decoding method comprising: determining a decoding path of a data section including several predetermined-bit data units; determining the presence or absence of an error in the determined decoding path on the basis of decoding information contained in the data section; and establishing a new decoding path on the basis of the decoding information according to the presence or absence of the error.

Preferably, the determining step of the decoding path of the data section includes: detecting some decoding values having the lowest difference between the data units in all pre-stored decoding values classified into several groups according to transition states of the data units; and establishing the decoding path on the basis of the detected decoding values.

Preferably, the establishing step of the decoding path on the basis of the detected decoding values includes: establishing the decoding path of the data section according to a group to which each of the detected decoding values belongs.

Preferably, the determining step of the presence or absence of an error in the determined decoding path on the basis of the decoding information includes: comparing a path allowed by the decoding information with the determined decoding path, and determining the presence or absence of an error in the decoding path according to the comparison result.

Preferably, the establishing step of the new decoding path on the basis of the decoding information includes: searching for decoding paths allowed by the decoding information; and selecting a decoding path capable of generating a specific decoding value most similar with the data units from among the retrieved decoding paths.

Preferably, the method further comprises: selecting a decoding group designated by the established decoding path in pre-established decoding groups, each of which includes several decoding values; and selecting a decoding value most similar with the data from among decoding values contained in the selected decoding group.

In yet another aspect of the present invention, there is provided a data reproducing method comprising: reading data units recorded in a recording medium in predetermined units; determining a decoding path of the data units; determining the presence or absence of an error in the determined decoding path on the basis of decoding information contained in the data units; and establishing a new decoding path on the basis of the decoding information according to the presence or absence of the error.

Preferably, the reading step of the data recorded in the recording medium in predetermined units includes: illuminating a light signal on a predetermined area of the recording medium simultaneously while changing an incident angle; and reading the data from the light signal diffracted by the recording medium.

In yet another aspect of the present invention, there is provided a data reproducing apparatus comprising: a data reader for reading data units recorded in a recording medium in predetermined units; and a decoder for determining a decoding path of the data units, determining the presence or absence of an error in the determined decoding path on the basis of decoding information contained in the data units, and establishing a new decoding path on the basis of the decoding information according to the presence or absence of the error.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

Figure 1:
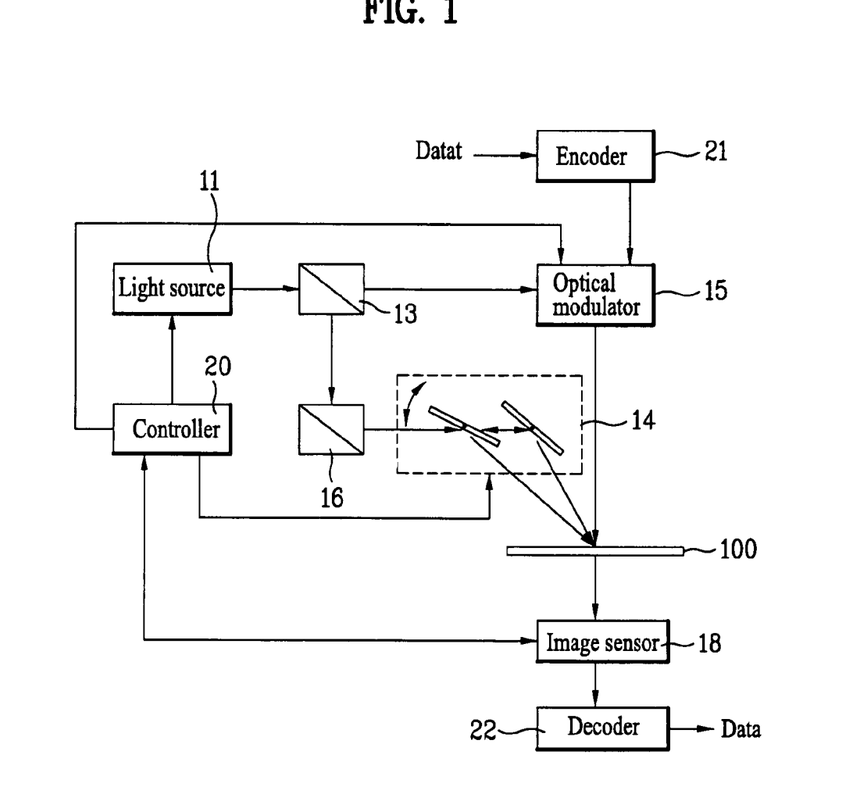
FIG. 1 is a block diagram illustrating a data recording/reproducing apparatus according to the present invention.

FIG. 1 is a block diagram illustrating a data recording/reproducing apparatus according to the present invention. For the convenience of description, it should be noted that only necessary constituent components other than general constituent components are shown in FIG. 1.

Although FIG. 1 exemplarily shows an apparatus for recording/reproducing data in/from a holographic recording medium, it should be noted that the scope of the present invention is not limited to the above-mentioned example, and can also be applied to other apparatuses for recording/reproducing data in/from a variety of recording mediums, for example, a CD, a DVD, a HD-DVD (High-Density Digital Versatile Disc), a BD (Blu-ray Disc), and a near-field recording medium, etc.

Referring to FIG. 1, the data recording/reproducing apparatus includes a light source 11, first and second beam-splitters 13 and 16, a part 14 for adjusting a reference light signal (i.e., a reference-light adjuster 14), an optical modulator 15, an image sensor 18, an encoder 21, and a decoder 22.

In this case, the light source 11, the first and second beam splitters 13 and 16, the reference-light adjuster 14, the optical modulator 15, and the image sensor 18 configure an optical system, i.e., a head.

The light source 11 generates a high-interference light signal such as a laser beam, so that it includes a gas laser, a solid laser, or a semiconductor laser, and a semiconductor diode. A collimation lens for collecting the light signal generated from the light source 11 may be arranged at an output terminal of the light source 11, so that it prevents the dispersion of the light signal.

The first beam splitter 13 receives the light signal generated from the light source 11, and divides the received light signal into a signal light and a reference light. The first beam splitter 13 includes at least one transparent substrate and at least one grating layer for diffracting the light signal, or may also include a mirror for partially reflecting the light signal and passing the remaining parts other than the reflected light part.

The encoder 21 receives data from a PC, a host or a main control unit, and modulates the received data into a standard/type recordable in the recording medium 100 by referring to the pre-stored tables.

Figure 2:
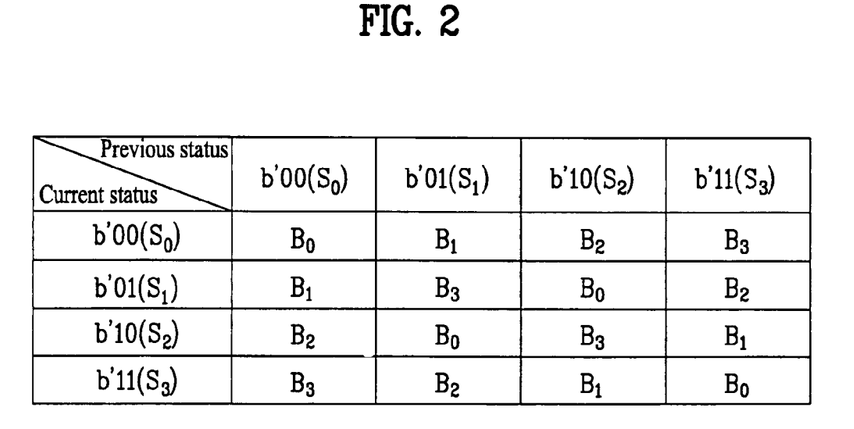
FIG. 2 is an example of a first table according to the present invention.
Figure 3:
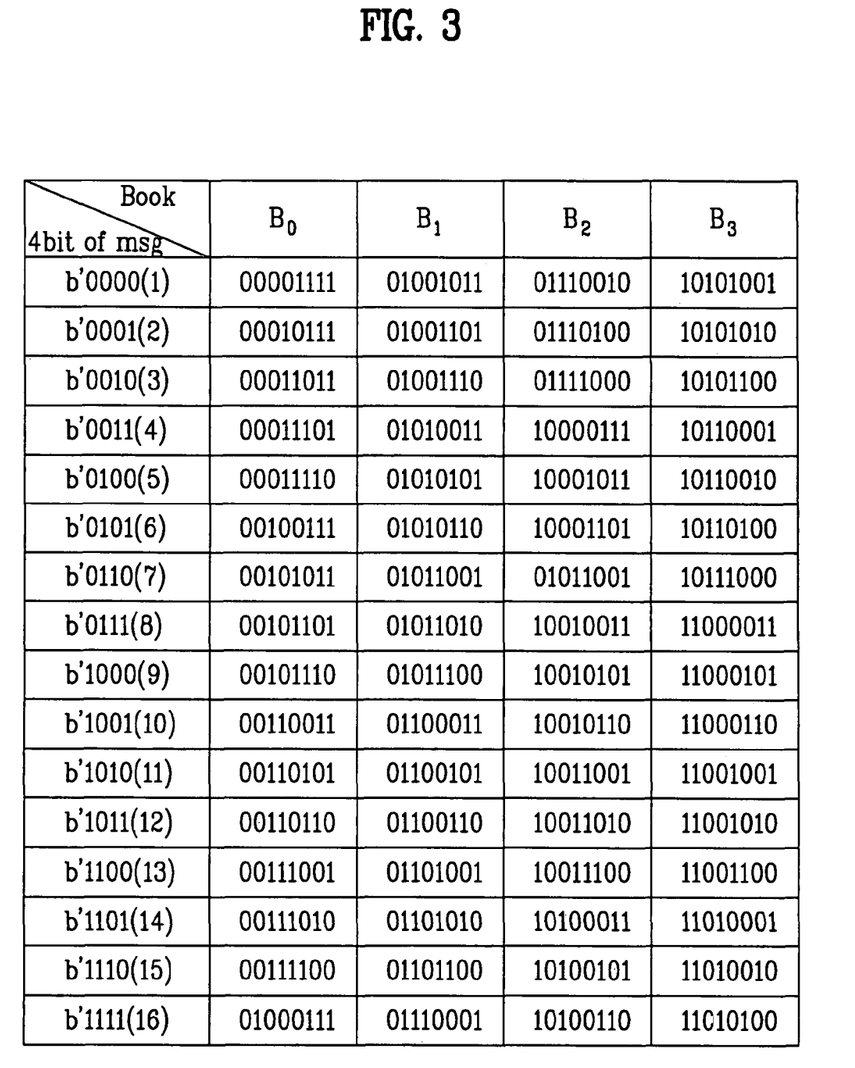
FIG. 3 is an example of a second table according to the present invention.

FIG. 2 shows a first table, i.e., a book selection table, stored in the encoder 21 or an additional memory (not shown). FIG. 3 shows a second table, i.e., a lookup table, stored in the encoder 21 or the additional memory (not shown).

For example, the encoder 21 refers to the first table, so that it selects an encoding group (or an encoding book) of the current message word according to a difference between data units received in M bit units. In other words, the encoder 21 selects the encoding group according to a difference between a transition value of a previous message word and a transition value of a current message word.

The encoder 21 selects the encoding value (i.e., codeword) corresponding to the current message word from the selected encoding group by referring the second table.

In this case, the encoding groups are distinguished according to a transition value of the message word. Specifically, the encoding groups are distinguished according to a variation value of a specific bit contained in the message word. The encoder 21 converts a message word of M bits into a codeword of N bits. A detailed encoding method will hereinafter be described.

The optical modulator 15 configures the codewords generated from the encoder 21 in the form of a pattern, includes the patterned N-bits codewords in the signal light generated from the first beam splitter 13, and scans the signal light on the recording medium 100. For example, the optical modulator 15 includes binary data denoted by black-and-white dot patterns in the above-mentioned signal light scanned on the recording medium.

The reference-light adjuster 14 receives the reference light from the second beam splitter 16, adjusts an incident angle, direction, wavelength, and phase of the reference light according to a command of the controller 20, and illuminates the adjusted reference light on the recording medium 100.

The reference-light adjuster 14 multiplexes the angle of the reference light to record or reproduce data. In this case, the multiplexing indicates that the incident angle of the reference light scanned on a predetermined area of the recording medium 100 is continuously changed to record or reproduce data.

If the above-mentioned multiplexing method is used, several hundreds of holograms or several thousands of holograms configured in page units of binary data can be stored in the same place. In other words, a large amount of data is recorded or reproduced in page units, so that data can be recorded or reproduced with a high storage density.

The reference-light adjuster 14 includes a mirror for reflecting the reference light and a mirror driver for rotating or moving the mirror according to a command of the controller 20, so that it can adjust the incident angle or direction of the reference light.

If data stored in the recording medium 100 is reproduced, the reference light scanned by the reference-light adjuster 14 is diffracted by an interference pattern of data recorded in the recording medium 100. Therefore, the reference light, which passes the recording medium 100 or is diffracted by the recording medium 100, includes a data image recorded in the recording medium 100.

The controller 20 determines a specific time at which the data image is to be captured, on the basis of the detected light intensity. The closer the incident angle of the record light signal scanned on the recording medium 100 is to a specific incident angle at which the data image recorded in the recording medium 100 can be read, the higher the detected light intensity.

Therefore, the controller 20 can recognize a specific time, at which the data image can be correctly captured, on the basis of the light intensity detected by either a photo-detector or the image sensor 18. For example, if the detected light intensity reaches the maximum light intensity at a specific time, the controller 20 determines this specific time to be a desired time at which the data image is to be captured.

The image sensor 18 composed of a semiconductor image-pickup device such as a charge-coupled device (CCD) receives a control signal from the controller 20, and captures a data image, which has passed through the recording medium 100 or has been diffracted by the recording medium 100, from a reproduced light signal.

The image sensor 18 shown in FIG. 1 is arranged to capture the data image passing through the recording medium 100. However, the image sensor 18 reacts to the reference light, so that it may also be arranged to receive the reproduced light signal (i.e., data image) generated in a reflection direction of the recording medium 100. The image sensor 18 converts the captured data image into analog signals of N-bit units.

The decoder 22 determines each bit of the analog signal generated from the image sensor 18 to be "1" or "0" according to the signal intensity. For example, the decoder 22 determines an analog signal of 8 bits (i.e., 0.36, 0.74, 0.91, 0.77, 0.13, 0.07, 0.57, and 0.01) generated from the image sensor 18 to be "1" or "0" according to the signal intensity of each bit. Therefore, the decoder 22 acquires digital data (01110010) composed of 8 bits, each of which is denoted by "1" or "0".

The decoder 22 decodes the above-mentioned N-bits data into original M-bits data by referring to the pre-stored first and second tables in the same manner as in the encoder 21. A detailed decoding method will hereinafter be described.

Although the controller 20, the encoder 21, and the decoder 22 in the above-mentioned data recording/reproducing apparatus are separated from each other, it should be noted that the controller 20, the encoder 21, and the decoder 22 may also be integrated with each other. For example, the controller 20 may include the encoding/decoding functions of the encoder 21 and the decoder 22, and the encoding/decoding functions may also be carried out by other modified units.

Figure 4:
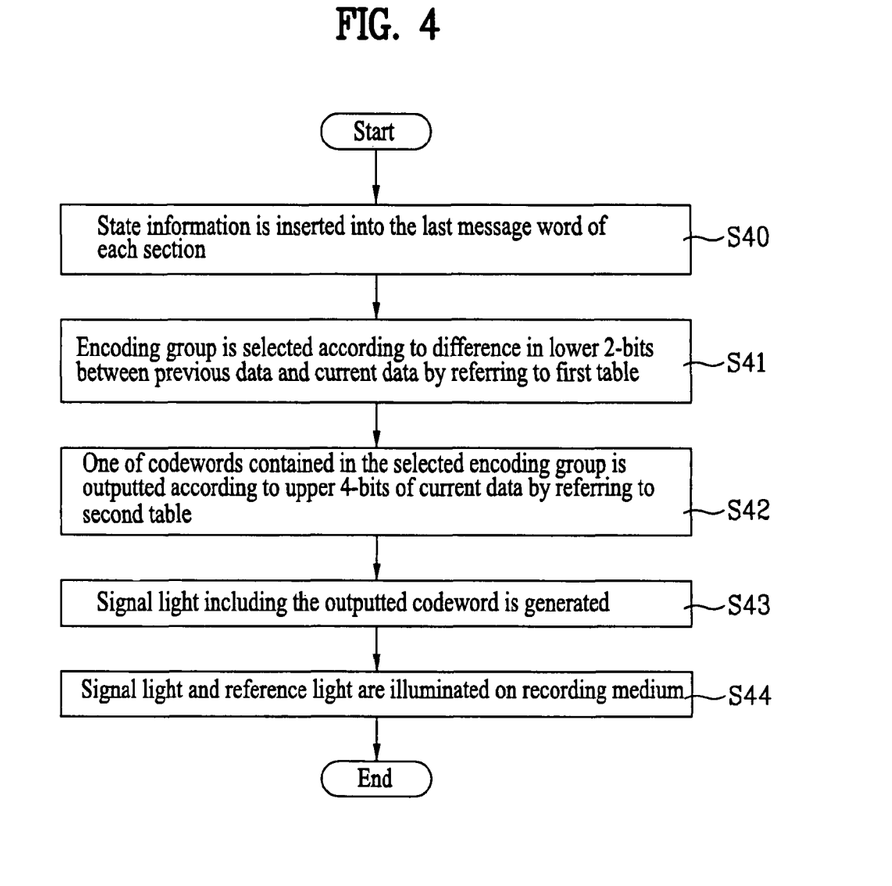
FIG. 4 is a flow chart illustrating a method for encoding/recording data according to the present invention.

The method for recording data according to the present invention will hereinafter be described. FIG. 4 is a flow chart illustrating a method for recording data in a holographic recording medium according to the present invention.

Although the present invention is not limited to the method for recording/reproducing data in a holographic recording medium, and can also be applied to other examples for recording/reproducing data in/from a variety of recording mediums, for example, a CD, a DVD, a HD-DVD (High-Density Digital Versatile Disc), a BD (Blu-ray Disc), and a near-field recording medium, etc.

Upon receiving the record command, the controller 20 arranges the mirror contained in the reference-light adjuster 14 to a specific location at which data can be recorded. For example, the mirror of the reference-light adjuster 14 moves to a corresponding area of the recording medium 100 according to predetermined location/angle information, so that a data image of a first page can be recorded in the corresponding area of the recording medium 100.

The light signal generated from the light source 11 is transmitted to the first beam splitter 13. The light signal received in the first beam splitter 13 is divided into a reference light and a signal light, so that the reference light is transmitted to the reference-light adjuster 14 and the signal light is transmitted to the optical modulator 15.

In this case, the encoder 21 receives data from the PC, the host or the main control unit, and encodes the received data into a standard/type recordable in the recording medium 100.

The above-mentioned method for encoding data will hereinafter be described.

Figure 5:
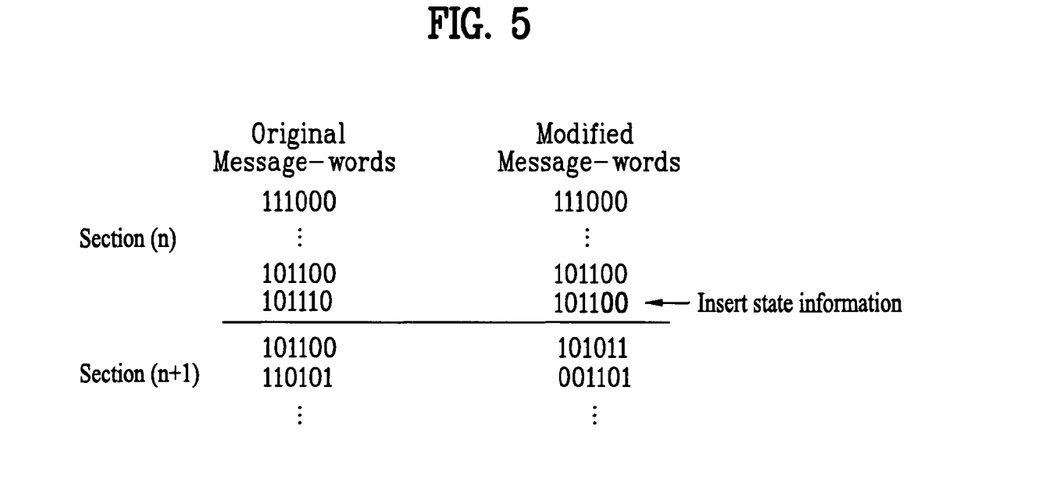
FIG. 5 is a conceptual diagram illustrating an encoding method according to an embodiment of the present invention.

Referring to FIG. 5, the encoder 21 divides the data into predetermined processing units (i.e., sections). The encoder 21 inserts predetermined status information into a specific bit (e.g., lower 2-bits) of the last message word contained in each section at step S40. If the status information is periodically inserted into the data, the encoder 21 can recognize the beginning and end points of the above-mentioned section according to the presence or absence of the status information.

In this case, the status information (or decoding information) is used to determine the presence or absence of any error encountered in the decoding process of the section-unit data pieces, and indicates a designated status (e.g., S00) of the last codeword contained in the section to be encoded.

Thereafter, the encoder 21 encodes the data by referring to the pre-stored tables.

Figure 6:
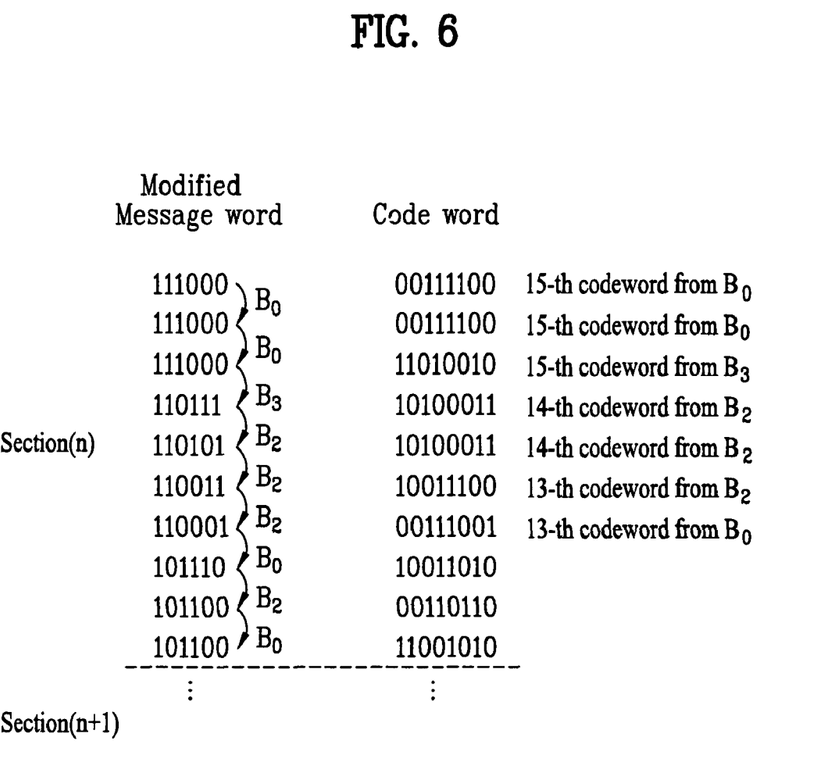
FIG. 6 is a conceptual diagram illustrating an encoding method according to another embodiment of the present invention.

For example, as shown in FIG. 6, provided that message words, each of which has 6 bits are received, the lower 2 bits of a first message word "111000" are "00" and the lower 2 bits of a second message word "111000" are "00", the encoder 21 selects the encoding group $B_0$ from the first table at step S41.

Then, the encoder 21 searches for a codeword corresponding to the upper 4-bits of the second message word "111000" from among the codewords of the selected encoding group $B_0$ by referring to the second table at step S42. In other words, the encoder 21 selects the 15-th codeword "00111100" of the selected encoding group $B_0$. Therefore, the encoder 21 outputs an 8-bit codeword "00111100" corresponding to the second message word "111000". In this case, the second table includes four encoding groups, each of which has 16 codewords, so that the resultant table composed of 64 codewords is implemented. In this way, the encoder 21 can also search for a codeword corresponding to a second message word "111000".

In the case of a third message word "111000", the lower 2-bits are "00" and the lower 2-bits of the fourth message word "110111" are "11", so that the encoder 21 selects the encoding group $B_3$ from the first table.

The encoder 21 selects the 15-th codeword "11010010" corresponding to the upper 4-bits "1110" of the third message word "111000" in the selected encoding group $B_3$. In this way, the encoder 21 outputs an encoding value (i.e., codeword) of message words each having 6 bits. The encoding value generated from the encoder 21 includes 8 bits composed of "1111" and "0000".

The process for converting the message word into the codeword, i.e., the encoding process, is executed in section units, so that the period for converting the message word into the codeword is variable with the number of message words to be included in a single data image.

If the message words contained in the section are encoded or converted into codewords, the optical modulator 15 configures the codeword generated from the encoder 21 in the form of a pattern, includes the patterned codewords in the signal light generated from the first beam splitter 13 at step S43, and illuminates the signal light and the reference light on the recording medium 100 at step S44.

If the signal light is illuminated on the recording medium 100 via the optical modulator 15 and the reference light is illuminated on the recording medium 100 via the reference-light adjuster 14, the signal light and the reference light interfere with each other, and data contained in the signal light is recorded in the recording medium in the form of a hologram.

In this case, the mirror of the reference-light adjuster 14 continuously changes the incident angle of the reference light in the range from a minimum incident angle to a maximum incident angle according to a command of the controller 20. During the scanning operation from the minimum incident angle to the maximum incident angle, data images of several pages can be sequentially recorded in the recording medium 100. In this case, the minimum incident angle is indicative of the incident angle of the reference light to read data of a first page, and the maximum incident angle is indicative of the incident angle of the reference light to read data of the last page.

If all of data images are recorded in a predetermined area of the recording medium 100, the controller 20 determines whether or not to record more data images in the next book. If necessary, the controller 20 moves the reference-light adjuster 14 to record data in the next area, and then data is recorded according to the above-mentioned method.

A method for reproducing data according to the present invention will hereinafter be described.

Figure 7:
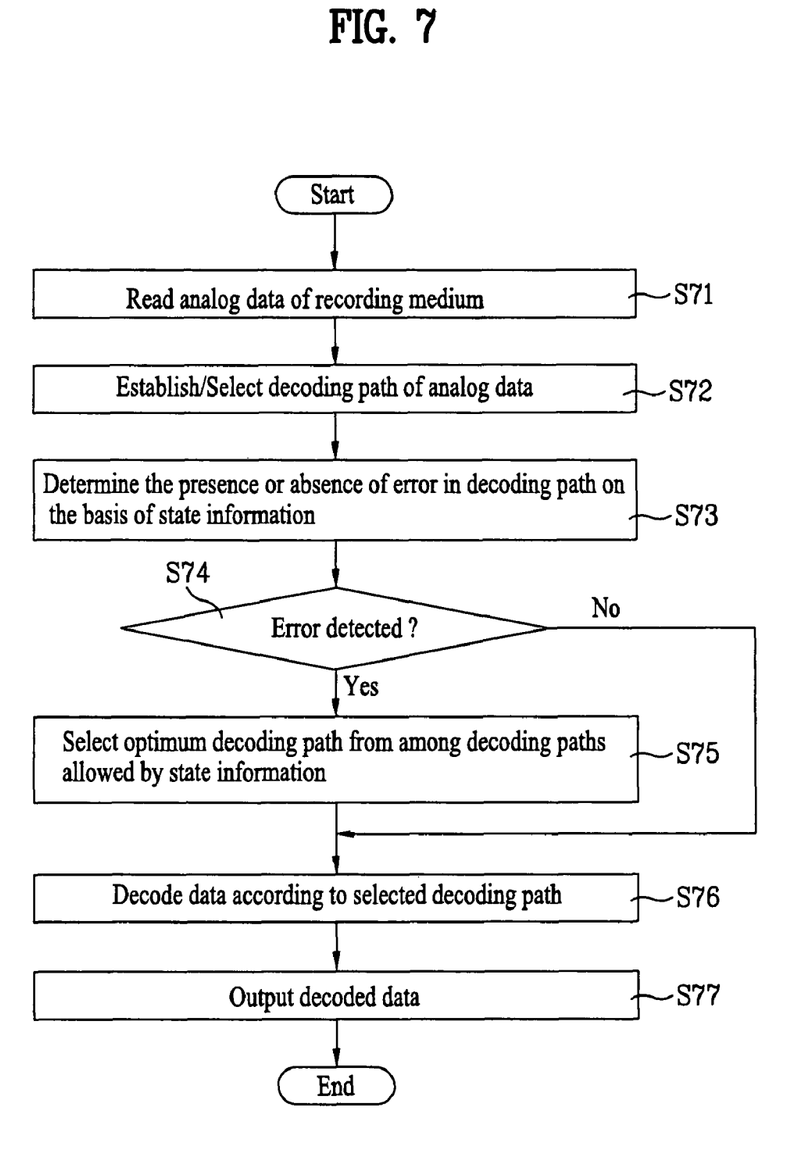
FIG. 7 is a flow chart illustrating a method for decoding/reproducing data according to the present invention.

FIG. 7 is a flow chart illustrating a method for reproducing data according to the present invention.

Referring to FIG. 7, if data stored in the recording medium is reproduced, the controller 20 moves the mirror of the reference-light adjuster 14 to a specific location at which data can be reproduced. In other words, the controller 20 moves the mirror of the reference-light adjuster 14 to a specific location, at which the reference light can be scanned on a corresponding area of the recording medium on the basis of a page address of the stored data.

Specifically, it is preferable that the mirror of the reference-light adjuster 14 is located at a specific location from among data (i.e., data images) of several pages stored in the corresponding area of the recording medium 100. In this case, it should be noted that data of either a first page or the last page can be read at the above-mentioned specific location.

Thereafter, the light signal generated from the light source 11 is transmitted to the first beam splitter 13 via the lens 12. The light signal received in the first beam splitter 13 is transmitted to the reference-light adjuster 14 and the optical modulator 15. There is no need to use the signal light while reproducing data, so that the light signal applied to the optical modulator 14 is not scanned on the recording medium 100.

If the reference light begins to be illuminated on the recording medium 100 via the reference-light adjuster 14, the mirror of the reference-light adjuster 14 continuously changes the incident angle of the reference light in the range from a minimum incident angle to a maximum incident angle and vice versa, upon receiving a command from the controller 20.

In this case, during the scanning operation from the minimum incident angle to the maximum incident angle, the image sensor 18 sequentially captures/reads data of several pages recorded in the recording medium 100. The image sensor 18 outputs the captured data in predetermined units at step S71. For example, the image sensor 18 outputs the captured data configured in the form of 8-bit analog data at step S71.

Then, the decoder 22 establishes/selects a decoding path of the above-mentioned 8-bit analog data generated from the image sensor 18 at step S72. In this case, the decoding path may be established or selected in section units.

Figure 8:
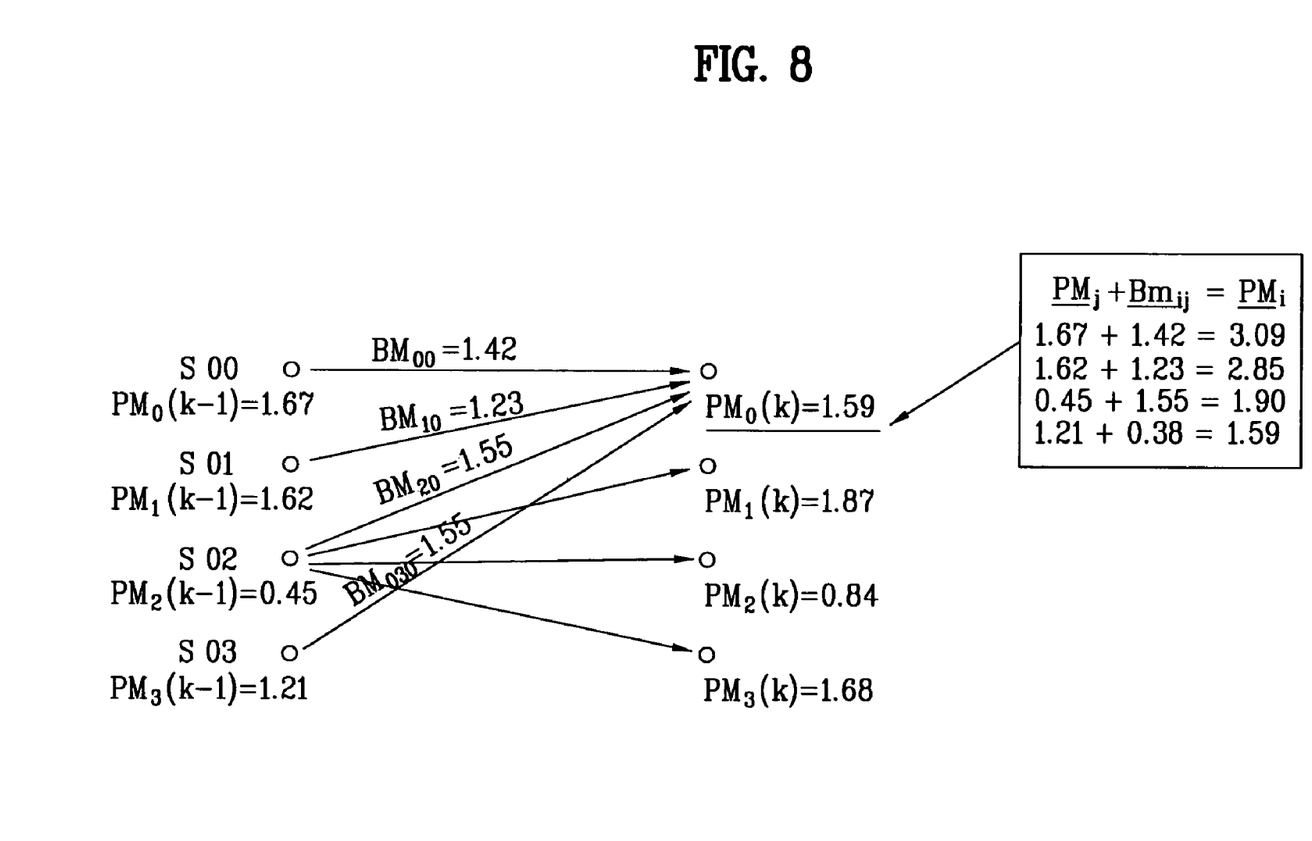
FIG. 8 is a conceptual diagram illustrating a method for establishing some parts of a decoding path according to the present invention.

A method for establishing/selecting the above-mentioned decoding path will hereinafter be described. FIG. 8 is a conceptual diagram illustrating a method for establishing a decoding path of specific analog data.

Referring to FIG. 8, the decoder 22 compares 8-bit analog data with all the codewords contained in each encoding group (book), and calculates a distance (i.e., similarity) between the 8-bit analog data and each codeword.

A representative method for calculating the distance (i.e., similarity) between the 8-bit analog data and the codeword will hereinafter be described.

If individual bit values of the 8-bit analog data are 0.36, 0.74, 0.91, 0.77, 0.13, 0.07, 0.57, and 0.01, the distance between the analog data and the first codeword "00001111" of the encoding group $B_0$ is represented by $$\sqrt{\begin{array}{l}(0.36-0)^2+(0.74-0)^2+(0.91-0)^2+\\(0.77-0)^2+(0.13-1)^2+(0.07-1)^2+\\(0.57-1)^2+(0.01-1)^2\end{array}}$$

The distance between the analog data and the first codeword "10101001" of the encoding group $B_3$ is represented by $$\sqrt{\begin{array}{l}(0.36-1)^2+(0.74-0)^2+(0.91-1)^2+\\(0.77-0)^2+(0.13-1)^2+(0.07-0)^2+\\(0.57-0)^2+(0.01-1)^2\end{array}}$$

In this way, the decoder calculates the distance to the codeword contained in each encoding group, and searches for a codeword having a minimum distance for each encoding group. In this case, the distance between the codeword having the minimum distance and the 8-bit analog data is called "branch matrices" (BM).

The BM of each encoding group is stored in a memory, etc. The decoder 22 adds the BM of a corresponding encoding group to each path matrix PM0($k$−1), PM1($k$−1), PM2($k$−1), or PM3($k$−1), so that it forms current-status path matrices PM0($k$), PM1($k$), PM2($k$), and PM3($k$).

In this case, the current-status path matrices may be formed in various paths from previous states. For example, as shown in FIG. 8, the path matrix having the most appropriate previous status in which the analog data (0.36, 0.74, 0.91, 0.77, 0.13, 0.07, 0.57, and 0.01) goes to the current-status path matrix PM0($k$) is equal to PM3($k$−1). In this way, the most appropriate path forward the remaining current-status path matrix PM1($k$), PM2($k$), or PM3($k$) is established. Also, the BM and the PM of the 8-bit analog data are decided by the same method. Therefore, the decoder 22 performs a trace-back process to search for a minimum distance value from the last path matrix of the section to the first path matrix, and establishes a decoding path.

If each decoding path of each analog data contained in the section is determined, the decoder 22 detects status information inserted into the last message word of the section during the encoding process, and determines the determined decoding path on the basis of the detected status information at steps S73 and S74.

In other words, if the status information "00" is inserted into the last message word during the encoding process, the status of the last path matrix (PM) of a corresponding section should be equal to "S00". If the status of the last path matrix is not equal to "S00", the decoder 22 determines the presence of an error in the determined decoding path.

Figure 9:
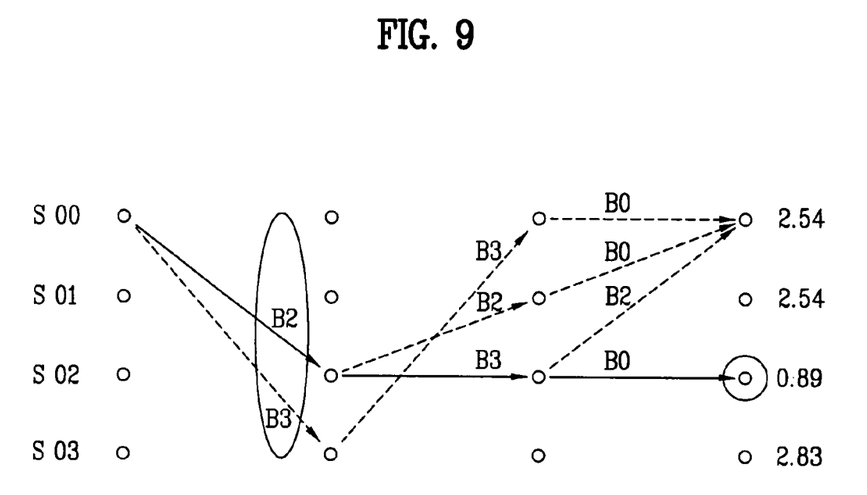
FIG. 9 is a conceptual diagram illustrating a method for establishing all parts of a decoding path according to the present invention.

FIG. 9 is a conceptual diagram illustrating a method for determining the decoding path. Referring to FIG. 9, if the status information "00" is inserted into the last message word during the encoding process, the last path matrix value of a corresponding section must have the value of 2.54. If the value of the last path matrix is 0.89, the decoder 22 determines the presence of an error in the decoding path.

If there is an error in the determined decoding path, the decoder 22 searches for all the decoding paths to correct the error on the basis of the stored BMs and PMs. In this case, the decoding paths allow the last path matrix status to be brought to "S00" designated by the status information. The decoder 22 selects an optimum specific path, by which the last PM value is minimum, from among the decoding paths at step S75.

Figure 10:
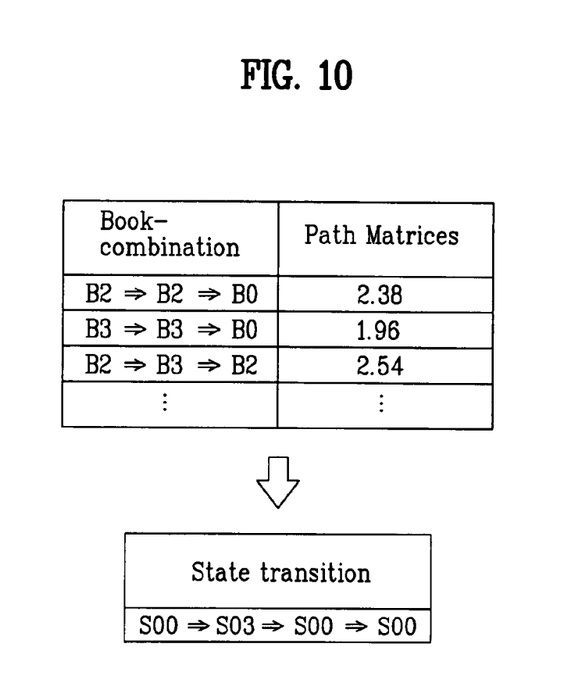
FIG. 10 is a conceptual diagram illustrating a method for establishing a new decoding path having no errors according to the present invention.

For example, if the path "B3-B3-B0" has a minimum PM value as shown in FIG. 10, the above-mentioned path "B3-B3-B0" is determined to be an optimum decoding path. Therefore, an erroneous decoding path is corrected.

Thereafter, the decoder 22 converts the 8-bit analog data into digital data. For example, the decoder 22 determines a bit value of the analog data, determines first- to fourth-order bits to be "1" according to the bit value, and determines fifth- to eighth-order bits to be "0" according to the bit value.

For example, each of 0.74, 0.91, 0.77, and 0.57 from among the analog data composed of 0.36, 0.74, 0.91, 0.77, 0.13, 0.07, 0.57, and 0.01 is considered to be "1", and the remaining values are considered to be "0". Therefore, the decoder 22 acquires 8-bit data "01110010". Other methods other than the above-mentioned method can also be used as the above-mentioned method for converting the 8-bit analog data into digital data.

If the analog data is converted into digital data, the decoder 22 decodes the digital data according to the optimum decoding path at step S76. In this case, the decoder 22 decodes the 8-bit digital data by referring to the first and second tables according to the decoding path.

For example, if the optimum decoding path is "B3-B3-B0", and digital data is "11010001", "10100011", and "00110110", the best codeword, which is most similar to the 8-bit data "11010001" in the encoding group $B_3$ of the second table, is the 14-th codeword "11010001". The decoder 22 determines the upper 4-bits of the decoding value to be "1101". Provided that the lower 2-bits of initial data in the first table is denoted by "00", the encoding group is $B_3$, so that the decoder 22 determines the lower 2-bits of the decoding value to be "11".

Therefore, the decoder 22 outputs a decoding value "110111" corresponding to the 8-bit data "11010001" at step S77. In this way, the 8-bit data is encoded into 6-bit data in reverse order of the encoding process. The decoding value of the remaining 8-bit data can be calculated and outputted in the same way.

The error decoding process and the decoding process of the above-mentioned decoding path are executed in section units, so that the decoder 22 outputs the decoding value configured in section units. The decoding values generated from the decoder 22 are transmitted to a PC, a host, or an audio/video device, etc., so that they are reproduced by the PC, the host, and the audio/video device.

As apparent from the above description, the encoder and decoder according to the present invention encode and decode by referring to status information of previous data, respectively, so that errors generated by device characteristics or external environments can be corrected, and data can be correctly modulated or decoded.

The present invention determines whether there is an error in a decoding path on the basis of the decoding information generated from the encoding path, so that data can be more stably decoded and reproduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A data encoding method comprising:
    inserting decoding information into a data section including several predetermined-bit data;
    determining encoding values of the data according to a transition state of the data and a value of corresponding data; and
    generating the decoding information and the determined encoding values in units of the data section.

2. The method according to claim 1, wherein the inserting step includes:
    inserting the decoding information into the last data contained into the data section.

3. The method according to claim 2, further comprising:
    inserting the decoding information into lower 2-bits of the last data contained in the data section.

4. The method according to claim 1, wherein the decoding information is indicative of a decoding value of the last data contained in the data section.

5. The method according to claim 1, wherein the determining step includes:
    selecting one of several encoding groups, each of which includes several encoding values, according to transition states of previous and current data; and
    generating one of encoding values contained in the selected encoding group according to a value of a predetermined bit of the current data.

6. The method according to claim 5, further comprising:
    selecting one of the encoding groups according to transition states of lower 2-bits of the previous data and lower 2-bits of the current data.

7. The method according to claim 5, further comprising:
    generating one of encoding groups contained in the selected encoding group according to a value of upper 4-bits of the current data.

8. The method according to claim 5, wherein each of the encoding groups includes 16 encoding values.

9. A data encoding apparatus comprising:
    an encoder for inserting decoding information into a data section including several predetermined-bit data, and determining encoding values of the data according to a transition state of the data and a value of corresponding data; and
    a data output unit for outputting the decoding information and the determined encoding values in units of the data section.

10. The apparatus according to claim 9, wherein the encoder inserts the decoding information into the last data contained into the data section.

11. The apparatus according to claim 10, wherein the encoder inserts the decoding information into lower 2-bits of the last data contained in the data section.

12. The apparatus according to claim 9, wherein the encoder selects one of several encoding groups, each of which includes several encoding values, according to transition states of previous and current data, and selects one of encoding values contained in the selected encoding group according to a value of a predetermined bit of the current data.

13. The apparatus according to claim 12, wherein the encoder selects one of the encoding groups according to transition states of lower 2-bits of the previous data and lower 2-bits of the current data.

14. The apparatus according to claim 12, wherein the encoder selects one of encoding groups contained in the selected encoding group according to a value of upper 4-bits of the current data.

15. The apparatus according to claim 12, wherein the encoder converts the current data of 6 bits into an encoding value of 8 bits composed of "1111" and "0000".

16. A data recording method comprising:
    inserting decoding information into a data section including several predetermined-bit data;
    determining encoding values of the data according to a transition state of the data and a value of corresponding data; and
    recording the decoding information and the determined encoding values in a recording medium in units of the data section.

17. The method according to claim 16, wherein the recording step includes:

generating a first light signal including the decoding information and the encoding values; and illuminating the first light signal on a predetermined area of the recording medium, and at the same time illuminating a second light signal on a predetermined area of the recording medium simultaneously while changing an incident angle.

18. A data recording apparatus comprising:

an encoder for inserting decoding information into a data section including several predetermined-bit data, and determining encoding values of the data according to a transition state of the data and a value of corresponding data; and a data recorder for recording the decoding information and the determined encoding values in a recording medium in units of the data section.

19. The apparatus according to claim 18, wherein the data recorder illuminates a first light signal including the decoding information and the encoding values on a predetermined area of the recording medium, and at the same time illuminating a second light signal on a predetermined area of the recording medium simultaneously while changing an incident angle.

* * * * *